United States Patent [19]
Diaz et al.

[11] Patent Number: 5,976,413
[45] Date of Patent: Nov. 2, 1999

[54] METHOD OF PREPARING A LEAD AND MANGANESE CO-ACTIVATED CALCIUM METASILICATE PHOSPHOR

[75] Inventors: Anthony L. Diaz, Athens, Pa.; Jenace A. Yurchisin, Dayton, Ohio

[73] Assignee: Osram Sylvania Inc., Danvers, Mass.

[21] Appl. No.: 09/067,464

[22] Filed: Apr. 28, 1998

[51] Int. Cl.⁶ .............................. C09K 11/55; C09K 11/59
[52] U.S. Cl. ........................................................ 252/301.4 F
[58] Field of Search ........................ 252/301.4 F, 301.4 R

[56] References Cited

U.S. PATENT DOCUMENTS

| | | |
|---|---|---|
| 2,299,510 | 10/1942 | Steadman .................................. 250/81 |
| 2,474,193 | 6/1949 | Schulman .............................. 252/301.4 |
| 2,497,140 | 2/1950 | Schulman .............................. 252/301.6 |
| 2,525,028 | 10/1950 | Froelich ................................ 252/301.6 |
| 2,542,322 | 2/1951 | Froelich ................................ 252/301.4 |
| 2,542,349 | 2/1951 | Ouweltjes ............................. 252/301.4 |
| 5,234,625 | 8/1993 | Forster ............................... 252/301.4 F |
| 5,472,636 | 12/1995 | Forster et al. ..................... 252/301.4 F |
| 5,611,961 | 3/1997 | Forster et al. ..................... 252/301.6 F |

*Primary Examiner*—C Koslow
*Attorney, Agent, or Firm*—Robert F. Clark

[57] ABSTRACT

A $CaSiO_3$:Pb,Mn phosphor is synthesized using a colloidal silica suspension wherein a cationic species is added to the suspension to form a well-mixed, easily-filtered, raw blend which reduces the filtering and calcining times required to produce a commercial quality phosphor.

19 Claims, No Drawings

METHOD OF PREPARING A LEAD AND MANGANESE CO-ACTIVATED CALCIUM METASILICATE PHOSPHOR

TECHNICAL FIELD

This invention relates to methods of making fluorescent lamp phosphors. More particularly, it relates to methods of making a lead and manganese co-activated calcium metasilicate phosphor using a colloidal silica suspension.

BACKGROUND ART

Lead and manganese co-activated calcium metasilicate phosphor ($CaSiO_3$:Pb,Mn) is a broad-band orange-red emitting phosphor used in fluorescent sign tubing and as a component in multi-phosphor blends for fluorescent lamps. Its preparation and use have been described in U.S. Pat. Nos. 5,472,636, 5,207,948, 2,542,349, 2,542,322, 2,525,028, 2,497,140, 2,474,193, and 2,299,510. The general method of preparation uses silicic acid or silica gel as the source of $SiO_2$ and dry-blending the $SiO_2$ with other raw materials (e.g., $CaCO_3$, $PbF_2$, and $MnCO_3$). The raw blend is fired subsequently at times and temperatures sufficient to form crystalline $CaSiO_3$:Pb,Mn. The relatively coarse nature of the silica sources, typically 5 to 12 $\mu$m, requires that long firing times, 12–20 hours, be used to form the finished $CaSiO_3$:Pb,Mn phosphor.

The use of fine silica in the form of a colloidal suspension as a raw material for the synthesis of silicate phosphors is also known (U.S. Pat. Nos. 5,234,625, 5,472,636, 5,611,961). These methods of preparation involve the mixing of a dispersion of the raw materials with the SiO2 suspension at temperatures of 50–90° C., followed by filtering of the resulting precipitate. This step is required for the flocculation and particle growth of the fine $SiO_2$ so that it can be filtered out of solution. However, the flocculation is dependent not only upon the degree of heating of the suspension, but is also sensitive to the surface charge and solubility of the materials being added to the suspension (carbonates, oxides, etc.), as well as to the intrinsic size of the fine silica being utilized. In the synthesis of $CaSiO_3$:Pb,Mn from colloidal silica, a filterable mixture cannot be obtained simply by adding the preferred starting materials to the suspension and then heating. That is, the fine silica does not flocculate, and therefore cannot be mechanically separated from solution. Even in cases where the raw mixture does filter, long times, more than 5 hours, are often required for this step because the filter is blinded by the fine particles. The formation of a homogeneous mixture of the raw materials (including silica) is not optimum under these conditions, because the fine $SiO_2$ tends to separate from the other materials during the long filtering step. Thus, even longer firing times, 15–30 hours, are required to prepare $CaSiO_3$:Pb,Mn phosphor according to these methods. In addition, it is sometimes necessary to utilize multiple firing steps with the addition of reaction aids between steps.

The long filtering and firing times and possible additional steps dictated by the prior art methods increase the manufacturing cost of the $CaSiO_3$:Pb,Mn phosphor. Thus, it would be an advantage to have a single step firing method which substantially reduced the filtering and firing times needed to produce the $CaSiO_3$:Pb,Mn phosphor.

SUMMARY OF THE INVENTION

It is an object of the invention to obviate the disadvantages of the prior art.

It is another object of the invention to provide a single step firing method for making a lead and manganese co-activated calcium metasilicate phosphor.

It is a further object of the invention to substantially reduce the filtering and firing times required for making a $CaSiO_3$:Pb,Mn phosphor.

In accordance with one object the invention, there is provided a method for making a lead and manganese co-activated calcium metasilicate phosphor. The method involves:

combining a source of calcium, a source of manganese and a source of lead with a colloidal suspension of fine particle size silica;

adding a cationic species to the suspension to induce flocculation and particle growth of the fine particle size silica;

heating and stirring the suspension at a temperature and for a time sufficient to cause the silica to achieve a filterable particle size;

filtering the suspension to obtain a filter cake, the filter cake being homogeneous and containing substantially all of the silica; and calcining the filter cake at a temperature and for a time sufficient to form the phosphor.

In accordance with another object of the invention, the method completes filtering of the suspension in less than about one-tenth the time needed to filter a similar suspension made without adding a cationic species.

DESCRIPTION OF THE PREFERRED EMBODIMENTS

For a better understanding of the present invention, together with other and further objects, advantages and capabilities thereof, reference is made to the following disclosure and appended claims.

The present invention is a method of making a lead and manganese co-activated calcium metasilicate phosphor ($CaSiO_3$:Pb,Mn). The method uses a colloidal silica suspension as the source of $SiO_2$. A cationic species is added to a mixture of the colloidal suspension and other raw materials. The cationic species induces flocculation and growth of the fine particle size silica and causes an intimate mixing of the raw materials. Filtering speed is greatly enhanced over the prior art methods. Typically, the filtering time is less than about one-tenth, and preferably less than about one-fifteenth, the time required for a similar method without the cationic addition. Additionally, there is no substantial loss of silica during filtering. Substantial loss of silica is indicated by a visibly clouded filtrate.

Because substantially all of the silica remains in the filtered cake and because there is no separation of the raw materials during filtering, an intimate, homogeneous mixture of raw materials is obtained. This in turn reduces firing time needed to form a commercial quality phosphor from the raw materials. Equally important, the firing can be performed in a single step. Typical firing time used in the method of this invention is less than about 10 hours and preferably less than about 7 hours at temperatures between about 1050° C. to about 1200° C. Compared to the prior art methods, total firing time can be less than about one-third of the previous methods.

The particle size of the silica in the colloidal suspension is less than about 100 nm. As described above, cationic additions are used to initiate the flocculation of the colloidal $SiO_2$ and promote growth of the fine particle size silica to a size sufficient to prevent the silica from passing through the filter, i.e., to achieve a filterable particle size. The source of the cation can be any soluble Group IA ($Li^{1+}$, $Na^{1+}$, $K^{1+}$, $Rb^{1+}$, or $Cs^{1+}$) or Group IIA ($Be^{2+}$, $Mg^{2+}$, $Ca^{2+}$, $Sr^{2+}$, or $Ba^{2+}$) salt, as well as the salts of various transition metal ions, particularly $Mn^{2+}$ and $Zn^{2+}$. Salts that produce $Ca^{2+}$ ion in aqueous solutions (e.g., $CaCl_2$, $Ca(OH)_2$, $Ca(NO_3)_2$ or some combination of these salts) are preferred over the salts of other cations because calcium is already present in the raw blend. Although cations are known to destabilize colloidal silica suspensions, this knowledge previously has not been applied to the preparation of silicate phosphors. While not wishing to be bound by theory, it is believed that the cationic species is attracted to the negatively charged surface of the $SiO_2$ particles. One possible effect of this attraction may be a reduction in the surface charge of the $SiO_2$ particles which causes a reduction in the electrostatic repulsion between particles. Or possibly, the cation is acting as a bridge between $SiO_2$ particles to produce the desired flocculation and growth of fine particle silica.

Generally, the method of the present invention involves adding a source of Pb, such as $PbF_2$ or PbO, a source of Ca, such as $CaCO_3$, and a source of Mn, such as $MnCO_3$, to a colloidal silica suspension and diluting the mixture with water. The preferred mole ratio of calcium to silicon is from 1:1 to 1:1.5. The mole ratios of lead and manganese must be sufficient to activate the phosphor. Preferably, the mole ratio of Ca to Pb is from 0.005 to 0.008 and the mole ratio of Ca to Mn is from 0.06 to 0.09.

To this mixture is added a cationic flocculating aid, such as $CaCl_2$. The mixture is then stirred for about 2 to about 4 hours while being heated at 65–90° C. to form a precipitate. The resulting precipitate is filtered and dried. The dried material is blended, possibly on a shaker with glass media, resulting in a fine powder which is then fired at times and temperatures sufficient to form a lead and manganese activated calcium metasilicate phosphor.

The following non-limiting examples are presented.

Several $CaSiO_3$:Pb,Mn phosphors were prepared using variations of the synthesis method described above. For these examples, the source of silica was Cab-O-Sperse A105 solution from Cabot Corp., Tuscola, Ill., an ultrafine silica (50–100 nm) suspension containing about 15% solids by weight. The total sample size was the about same in each example. The brightness and color point of these phosphors were measured under UV excitation (254 nm) and are compared in Table 1 to a commercial $CaSiO_3$:Pb,Mn phosphor synthesized using silicic acid as the source of $SiO_2$ (OSRAM SYLVANIA Products Inc. Type 290). The commercial product requires firing times in excess of twelve hours to prepare.

EXAMPLE 1

The following mole ratios of raw materials were used: 1.2 mole % $SiO_2$, 1.0 mole % $CaCO_3$, 0.0065 mole % $PbF_2$, and 0.06645 mole % $MnCO_3$. The component powders were added to the silica suspension and diluted with water; about 4 parts water to 1 part suspension by volume. The mixture was then stirred at about 65° for 3 hours. The precipitate was filtered on a Buchner funnel using a Whatman Type 41 ashless filter paper (>20–25 μm particle size retention). A vacuum was applied to aid filtering. However, since the mixture did not coagulate effectively, some fine $SiO_2$ initially passed through the filter. The filter then became blinded by the fine silica, so that a long time, about 15 hours, was required to finish filtering the precipitate. Separation of the silica from the other raw materials was evidenced by a layered appearance to the filtered cake. These filtering problems were not encountered in the preparations of the Examples 2–4, which make use of the addition of cationic species to the suspension. The filtered precipitate was dried at 135° C. for about 15 hours. The dried precipitate was then blended on a shaker using glass media, and the powder fired in a covered alumina crucible at 1150° C. for 4 hours.

EXAMPLE 2

This example was prepared using the same mole ratios used in Example 1. However, in addition to the $CaCO_3$, $MnCO_3$ and $PbF_2$, 0.00968 mole % $CaCl_2$ and 0.00091 mole % $Ca(OH)_2$ were added to the silica suspension. This mixture was stirred at 65° C. for 2 hours, rather than for 3 hours. Filtering was complete in less than one hour, with no loss of fine silica and no separation of the components. The material was dried, blended and fired as in Example 1.

EXAMPLE 3

This sample was prepared exactly as in Example 2, with the exception that 0.07745 mole % $MnCO_3$ was used. The suspension was mixed at 65° C. for 3 hours. Filtering was complete in less than one hour, with no loss of fine silica and no separation of the components. The material was dried, blended and fired as in Example 1.

EXAMPLE 4

This sample was prepared as in Example 3 with the exception 0.5% by weight $NH_4F$ was added to the dried precipitate before the blending and firing steps. Filtering was complete in less than one hour, with no loss of fine silica and no separation of the components. The material was dried, blended and fired as in Example 1.

TABLE 1

| Example | Relative Brightness (%) | CIE color coordinates (x,y) |
| --- | --- | --- |
| Standard | 100 | 0.5818, 0.4017 |
| 1 | 2.6 | 0.5391, 0.3986 |
| 2 | 103.8 | 0.5688, 0.4151 |
| 3 | 103.2 | 0.5815, 0.4027 |
| 4 | 106.2 | 0.5826, 0.4024 |

It is clear from the results in Table 1 that, in the absence of making a cationic addition to the colloidal suspension, the firing conditions (4 hours at 1150° C.) were insufficient in Example 1 to produce a phosphor equivalent to the commercial $CaSiO_3$: Pb,Mn phosphor standard. When the cationic species was added to the colloidal suspension as in Examples 2–4, filtering time was dramatically reduced to less than about $1/15^{th}$ of the time required in Example 1 and the firing conditions (4 hours at 1150° C.) were sufficient to produce phosphors exhibiting equivalent color and better brightness than the commercial $CaSiO_3$:Pb,Mn standard.

While there has been shown and described what are at the present considered the preferred embodiments of the invention, it will be obvious to those skilled in the art that various changes and modifications may be made therein without departing from the scope of the invention as defined by the appended claims.

We claim:

1. A method for making a lead and manganese co-activated calcium metasilicate phosphor comprising:

combining a source of calcium, a source of manganese and a source of lead with a colloidal suspension of fine particle size silica;

adding a cationic species to the suspension to induce flocculation and particle growth of the fine particle size silica;

heating and stirring the suspension at a temperature and for a time sufficient to cause the silica to achieve a filterable particle size;

filtering the suspension to obtain a filter cake, the filter cake being homogeneous and containing substantially all of the silica; and calcining the filter cake at a temperature and for a time sufficient to form the phosphor.

2. The method of claim 1 wherein the cationic species is $Ca^{2+}$.

3. The method of claim 2 wherein the cation species is added as $CaCl_2$, $Ca(OH)_2$, $Ca(NO_3)_2$, or a combination thereof.

4. The method of claim 1 wherein the cationic species is selected from Group IA, Group IIA or a transition metal.

5. The method of claim 4 wherein the cationic species is added as a soluble salt of a cation selected from Group IA, Group IIA or a transition metal.

6. The method of claim 1 wherein the cationic species is $Zn^{2+}$ or $Mn^{2+}$.

7. The method of claim 1 wherein the filtering of the suspension is completed in less than about one-tenth the time needed to filter a similar suspension made without adding a cationic species.

8. The method of claim 1 wherein the filtering of the suspension is completed in less than about one-fifteenth the time needed to filter a similar suspension made without adding a cationic species.

9. The method of claim 1 wherein the filter cake is calcined at between about 1050° C. to about 1200° C. for less than about 10 hours.

10. The method of claim 9 wherein the filter cake is calcined for less than about 7 hours.

11. The method of claim 7 wherein the filter cake is calcined at between about 1050° C. to about 1200° C. for less than about 10 hours.

12. A method for making a lead and manganese co-activated calcium metasilicate phosphor comprising:

combining a source of calcium, a source of manganese and a source of lead with a colloidal suspension of fine particle size silica, the fine particle size silica having a particle size of less than about 100 nm;

adding an amount of a $Ca^{2+}$ cation to the suspension to induce flocculation and particle growth of the fine particle size silica;

heating and stirring the suspension at a temperature from 65° C. to 90° C. and for a time sufficient to cause the silica to achieve a filterable particle size;

filtering the suspension to obtain a filter cake, the filter cake being homogeneous and containing substantially all of the silica; and calcining the filter cake at a temperature and for a time sufficient to form the phosphor.

13. The method of claim 12 wherein prior to adding the $Ca^{2+}$ cation the mole ratio of calcium to silicon is from 1:1 to 1:1.5, the mole ratio of calcium to lead is from 0.005 to 0.008, and the mole ratio of calcium to manganese is 0.06 to 0.09.

14. The method of claim 12 wherein the suspension is heated and stirred at about 65° C. for about 2 to about 4 hours.

15. The method of claim 12 wherein the filtering of the suspension is completed in less than about one-tenth the time needed to filter a similar suspension made without adding a cationic species.

16. The method of claim 14 wherein the filtering of the suspension is completed in less than about one-fifteenth the time needed to filter a similar suspension made without adding a cationic species.

17. The method of claim 15 wherein the filter cake is calcined at between about 1050° C. to about 1200° C. for less than about 10 hours.

18. The method of claim 17 wherein the filter cake is calcined for less than about 7 hours.

19. The method of claim 16 wherein the filter cake is calcined at 1150° C. for 4 hours.

* * * * *